United States Patent [19]

Froberg

[11] 4,358,304

[45] Nov. 9, 1982

[54] METHOD FOR PREPARING MOLTEN GLASS

[75] Inventor: Magnus L. Froberg, Granville, Ohio

[73] Assignee: Owens-Corning Fiberglas Corporation, Toledo, Ohio

[21] Appl. No.: 191,202

[22] Filed: Sep. 26, 1980

Related U.S. Application Data

[63] Continuation of Ser. No. 960,881, Nov. 15, 1978, abandoned, which is a continuation of Ser. No. 849,839, Nov. 9, 1977, abandoned, which is a continuation-in-part of Ser. No. 764,922, Feb. 2, 1977, abandoned, which is a continuation-in-part of Ser. No. 692,717, Jun. 4, 1976, abandoned, which is a continuation of Ser. No. 578,776, May 19, 1975, abandoned.

[51] Int. Cl.$^3$ .............................................. C03B 5/16
[52] U.S. Cl. .......................................... 65/27; 65/134; 65/135; 106/DIG. 8; 501/77
[58] Field of Search ................. 65/27, 134, 135, 2; 106/54, DIG. 8

[56] References Cited

U.S. PATENT DOCUMENTS

| | | |
|---|---|---|
| Re. 29,622 | 5/1978 | Lange ................................ 65/27 |
| 1,610,377 | 12/1926 | Hitner . |
| 2,114,545 | 4/1938 | Slayter . |
| 2,578,110 | 12/1951 | Tooley . |
| 2,597,585 | 5/1952 | Howard . |
| 2,597,640 | 5/1952 | Howard . |
| 2,634,555 | 4/1953 | Dempremy et al. . |
| 3,172,648 | 3/1965 | Brichard . |
| 3,185,554 | 5/1965 | Sweo et al. ......................... 65/17 |
| 3,350,213 | 10/1967 | Pyches ............................... 106/52 |
| 3,459,411 | 8/1969 | Jacobs ................................ 263/27 |
| 3,526,492 | 9/1970 | Motsch .............................. 65/335 |
| 3,607,190 | 9/1971 | Penberthy .......................... 65/17 |
| 3,726,697 | 4/1973 | Mod et al. .......................... 106/52 |
| 3,728,094 | 4/1973 | Bowman ............................ 65/27 |
| 3,788,832 | 1/1974 | Nisbitt ............................... 65/134 |
| 3,880,639 | 4/1975 | Boedner et al. .................... 65/134 |
| 3,953,190 | 4/1971 | Lange ............................. 65/27 X |
| 4,023,976 | 5/1977 | Bauer et al. ........................ 106/52 |
| 4,026,691 | 5/1977 | Lovett et al. ....................... 65/27 |
| 4,031,175 | 6/1977 | Cooper ........................... 65/27 X |
| 4,074,989 | 2/1978 | Brozowski et al. ............ 65/134 X |
| 4,074,990 | 2/1978 | Brozowski et al. ............ 65/134 X |
| 4,074,991 | 2/1978 | Brozowski et al. ................ 65/27 |

FOREIGN PATENT DOCUMENTS

1331673  9/1973  United Kingdom ................ 65/27

OTHER PUBLICATIONS

Glass Bach et al. "Problems in Modern Glass Melting" (2/1965).
Ceramic Bulletin Manring et al. "The Batch Preparation Process—Past Present Future," vol. 52 #8, P. 617 (1973).
Glasteknisk Tidskrift "Developments in Glass Melting" Cable vol. 29 #1, pp. 11–20 (1974).
Glastechnische Berichte "Preparation of Batch Prior to Melting" Giegerich, vol. 24 #12, pp. 293–301 (12/1951).
Loewenstein, K. C. Manufacture Tech. of Cont. Glass Fibers; Elsevier. Pub. Co. Amsterdam, London, NY 1973, pp. 28–30.

Primary Examiner—Robert L. Lindsay, Jr.
Attorney, Agent, or Firm—Ronald C. Hudgens; Patrick P. Pacella; Hiram P. Settle

[57] ABSTRACT

Volatile borates and/or fluorides are removed from the hot stack gases of a glass furnace by passing the hot stack gases up through a layer of wet pellets containing ions of an alkaline earth metal or an alkali metal. The pellets may contain solid borates and/or fluorides as part of the feed to the glass furnace, and still absorb volatile materials from the stack gases, so long as the borates and/or fluorides in the pellets are in, or are converted to a less soluble and volatile form that are the volatile materials in the stack gases. $Ca(OH)_2$ is a preferred material for converting the volatiles into an essentially nonvolatile form. Ion exchange materials, such as clay, can also be used to capture these volatiles.

4 Claims, 1 Drawing Figure

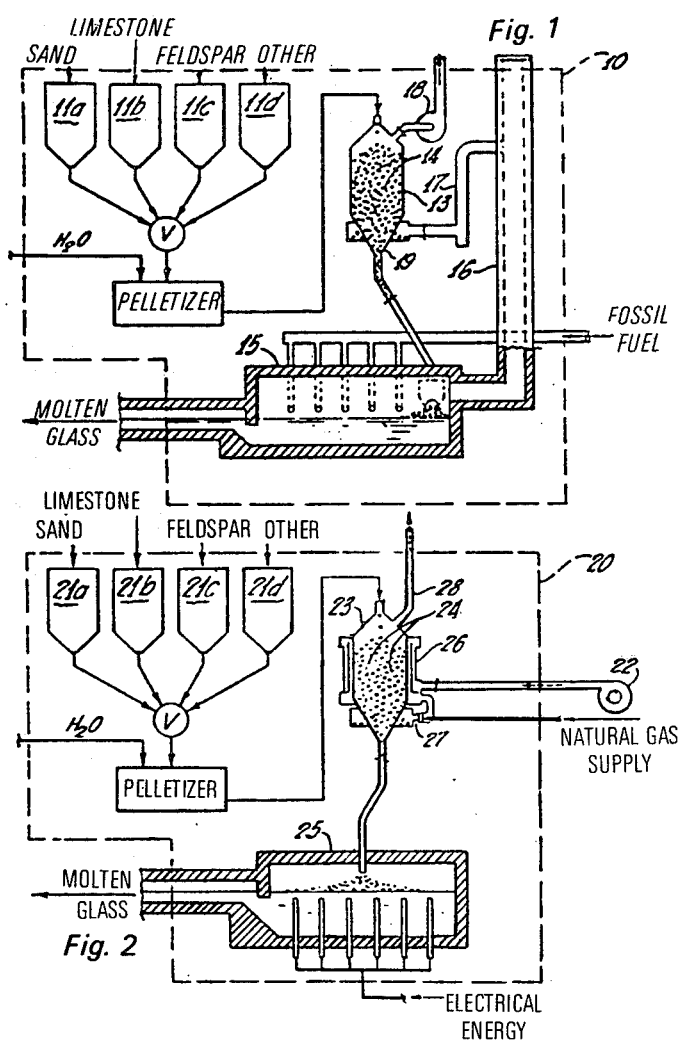

METHOD FOR PREPARING MOLTEN GLASS

This is a continuation of application Ser No. 960,881, filed Nov. 15, 1978, which in turn is a continuation of application Ser. No. 849,839, filed Nov. 9, 1977, which in turn is a continuation-in-part of application Ser. No. 764,922, filed Feb. 2, 1977, which in turn is a continuation-in-part of application Ser. No. 692,717 filed June 4, 1976, which in turn is a continuation of application Ser. No. 578,776 filed May 19, 1975 all now abandoned.

BACKGROUND OF THE INVENTION

The present invention relates to new and improved methods of removing volatiles, and particularly borates and flourides, from hot furnace gases.

In the manufacture of glass, fluxing materials are added to silica and/or high melting silicates, as for example the aluminum silicates, in order to produce an initial molten stage which hastens the dissolving of the silica and/or silicates; and in addition provides a manageable low melting temperature for the final glass product. Soda is an extensively used material for accomplishing these purposes; but soda by itself, produces glasses that are leachable in water and so have poor weathering characteristics. Soda glass is in fact so leachable that it cannot be used as the sole fluxing agent for glasses from which glass fibers are made; and so other fluxing materials, such as borates and/or flourides, are used to lower the melting temperature of the silicates, and provide silicates of sufficient low solubility in water that they have acceptable weathering characteristics. Glasses that contain borates and/or flourides, when in the molten stage, liberate borates and/or flourides, and these materials go out with the stack gases of the furnace. What is more, sodium borates and/or sodium flourides by themselves have appreciable vapor pressure at their melting temperatures so that a significant amount of these materials is lost when batches containing these materials are heated during the charging operation of glass furnaces. Borates and flourides produce ecological problems when they exit with stack gases; and so it has long been desired to find an economical way for extracting these volatile materials from the stack gases. It has been suggested heretofore that cooling air be mixed with stack gases to lower their temperature to the point where the volatile borates and fluorides condense into particulate matter which can be extracted from the gases by means of bag filters and/or electostatic precipitators. These methods of extraction are not economical, however, since the cooling air lowers the stack effect to such an extent that fans must be used to move the stack gases through the bag filters and/or electostatic precipitators. The cooling air that is introduced into the stack gases must be so voluminous, however, that the fan size becomes enormous, and the process uneconomical.

Prior to the present invention there has not been, to my knowledge, a process for extracting these volatiles from stack gases that is sufficiently simple, efficient, and economical to carry out, as to warrant commercial usage of the process.

An object of the present invention is the provision of a new and improved method of removing volatile borates and/or fluorides from the stack gases of glass furnaces, and the like.

Another object of the present invention is a new and improved process for preventing the escape of volatile borates and/or fluorides from batch materials during the time that the temperature of the batch materials is being raised to the temperature of complete fusion.

A further object of the present invention is the provision of a new and improved method of heating wet pellets of batch materials without destroying the pellets before they reach their molten stage.

Still further objects and advantages of the present invention will become apparent to those skilled in the art to which the invention relates from the following description of the preferred embodiments described with reference to the accompanying drawings forming a part of this specification.

BRIEF DESCRIPTION OF THE DRAWING

The single FIGURE of the drawing presents a typical gas fired glass melting system embodying principles of the present invention.

PREFERRED EMBODIMENT OF THE INVENTION

Figure 3:
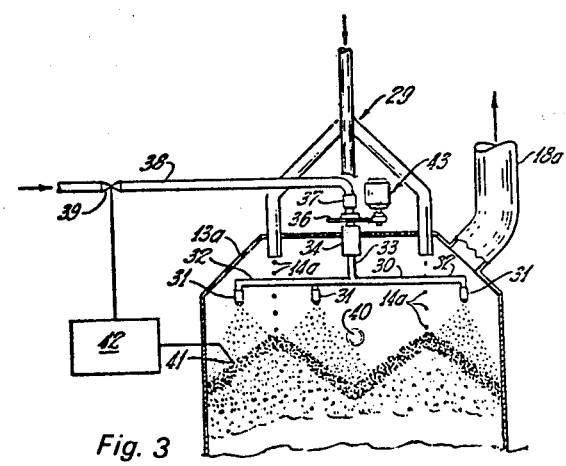

Referring now to the drawing, the single FIGURE presents a schematic showing of the principles of my invention as applied to a gas fired glass melter. Contained within the glass melting system 10 are raw material storage bins 11a, 11b, 11c, and 11d. The storage bins, for example, contain such raw materials as sand, limestone, feldspar or any other necessary constituents to the batch formulation. The basic raw materials are drawn from the storage bins and mixed in proportions in accordance with the desired batch formulation by any known batch formulation mixing apparatus represented in the FIGURE as mixing valve V. The formulated batch is preferably pelletized into batch pellets of approximately $\frac{1}{4}''$ to $\frac{5}{8}''$ in diameter. Any known dry material pelletizer such as the four foot diameter pelletizing disc manufactured by Dravo Corporation of Pittsburgh, Pennsylvania may be used. I have found it preferrable to add approximately 20% by weight of water to the batch formulation. The pellets are then fed into the top of pellet heating chamber 13 within which the moist pellets are dried and pre-heated to the desired temperature as they gravitate downward through the chamber 13.

The high temperature flue gases exhausted from gas fired melter 15 are conveyed from exhaust stack 16, by appropriate piping 17, into the bottom of pellet heating chamber 13. The hot flue gases, having entrained therein exhaust products from gas fired melter 15, are percolated upward through the gravitating pellets therein. Located at the top of the pellet heating chamber 13 is an exhaust fan 18 to assist in maintaining the proper flue gas flow rate through the pellet heating chamber 13. As the flue gas percolates upward through the gravitating batch pellets, heat is transfered from the hot gas to the pellets. As a result thereof the fluorides and borates entrained in the flue gas precipitate out and collect as condensables upon the batch pellets. Further, because of the percipitating fluorides and borates and sulfates coupled with the filtering effect of the pellet bed, entrained dust particles are also effectively removed from the flue gas. The percolating flue gases also reduce compaction of the pellet bed thereby assisting their flow downward to the chamber exit 19.

The most efficient transfer of heat from a hot gas percolating upward through a pelletized bed occurs at the point of bed fluidization. However, complete fluidization of the pellet bed causes disintegration of the batch pellets by elutriation. Therefore, it is preferred to maintain the pellet bed in a semifluid state thereby obtaining maximum heat transfer without pellet disintegration.

A system melting a typical E-type glass formulation of:

| CONSTITUENT | PERCENT BY WEIGHT |
|---|---|
| $SiO_2$ | 55.0 |
| $Al_2O_3$ | 15.0 |
| CaO | 22.0 |
| $B_2O_3$ | 7.0 |
| $F_2$ | 0.5 |
| $Na_2O$ | 0.5 | in a conventional gas fired melter supplying 15 tons of molten glass per day may be expected to produce a sufficient quantity of hot flue gas to adequately pre-heat the batch pellets. It has been determined that by introducing 1,500° F. flue gas to the pellet heating chamber and percolating it upward through a gravitating pellet bed 14 having a 46% porosity at a pore velocity of 200 feet per minute the pellets may be heated from ambient to approximately 1,400° F. prior to exiting the chamber. The maximum flue gas velocity that may be maintained through the pellet bed 14 without causing pellet dusting is the velocity which produces fluidation of the bed. Preferably, the velocity should be at least 75 % of the fluidizing velocity. For pellets between ½" and ⅝" in diameter a pore velocity between 200 feet per minute and 600 feet per minute will be acceptable. Heat balance calculations indicate that approximately 880,000 BTU per ton of the batch pellets processed may be reclaimed from the percolated flue gases by this process. This represents a 10 to 15 percent fuel savings for melter 15. It is preferred that the exhaust gas 18 exit temperature be greater than 250° F. to prevent water condensation within the pellet bed 14 or pellet heating chamber 13.

In operation the system establishes an equilibrium state whereby the batch constituents normally lost to the atmosphere are re-claimed and returned to the melting process. Hence, the batch formula must be adjusted compensating for the re-claimed constituents. In actual practice an electric melt batch formula may be effectively used in a gas melter embodying my invention. Thus, in a glass plant operation having both electric and gas fired melters one batch formula may be used in both type melters.

EXAMPLE

By way of further example, the following materials, within the ranges indicated in parts by weight below, are charged to the pelletizer of the drawing for making glass:

| | |
|---|---|
| $SiO_2$ | 20 to 35 |
| $Al_2O_3.2SiO_2.2H_2O$ (Kaolin) | 20 to 35 |
| $Ca_2CO_3$ | 15 to 25 |
| $2CaO.3B_2O_3.H_2O$ (Burnt Colemanite) | 10 to 25 |
| $Na_2SiF_6$ (Any inorganic fluoride) | 0.2 to 5 |
| $NaNO_3$ | 0 to 1 |
| $CaSO_4.2H_2O$ (Gypsum) | 0 to 1 |
| Water | 15 to 25 | with the total sodium and/or calcium salts that are ionizable in water at room temperature ($NaNO_3$ and/or gypsum) being at least 0.10% by weight. Aluminum silicates are of course clays which are plasticized by water into ion change materials when in the non-sintered wet condition. These materials also act as a binder for the wet pellets. As previously indicated, the flue gases from the furnace contain vaporized borates which are believed to be $H_3BO_3$ and/or $H_2B_4O_7$. Inasmuch as the pellets at the top of the bed of pellets 14 are wet, and these borates are soluble, the borates are extracted from the gases and go into solution. The burnt colemanite is only slightly soluble, so that the water of the pellets being charged is not saturated with borates. In addition, the solubility of these borates increases with temperature, so that more and more of the borates in the gases are picked up by the wet pellets as the pellets proceed down through the layer of wet pellets at the top of the pellet bed. It will further be seen that the pellets contain some ionizable alkali metal salts and/or alkaline earth salts. These ions react with boric acids to form much less soluble alkali metal borates and/or alkaline earth borates which also are much less volatile and higher melting. The borates which are extracted by the wet pellets are thus captured and converted to a generally nonvolatile phase before the pellets reach the temperature at which the acid borates are boiled off. In addition, by converting the borates into the preferred alkaline earth borates, the borates can be kept from fusing at the 740° C. range where the sodium tetraborates melt; and so the pellets can be heated safely to a higher temperature to remove more heat from the stack gases without the pellets being fused together.

If it is desired to use a sodium borate as a raw material for the pellets, it will be advantageous to also have some calcium ion and preferably $Ca(OH)_2$ in the wet pellets to react with the sodium borate and convert it into a less soluble and less volatile calcium borate before the pellets leave the wet layer at the top of the pellet bed.

When clay is used in the pellets, it not only acts as a wet binder for the pellets but aids in extracting borates and/or fluorides by ion exchange. Fluorides are also dissolved out of the hot gases by the water on the surface of the pellets; and what has been said about the capture of borates also applies to the fluorides. In general, the alkaline earth fluorides are less soluble than the alkali metal fluorides and they react with the alkaline earth metal ions to be taken out of solution. The alkaline earth fluorides are quite nonvolatile, so that the captured fluorides are retained through the preheated step until they reach the molten glass in the glass furnace. Conversion of the borates and fluorides to the alkaline earth form has the further advantage in that the pellets can be raised to a higher temperature before melting and fusing together. This allows more heat to be absorbed by the pellets without plugging equipment and thereby a greater thermal efficiency. Not only does the process of the present invention effectively remove borates and fluorides from furnace gases, but it is economical to carry out commercially, since the cost of the equipment that must be added to a glass furnace is largely offset by the savings in energy which the process provides.

In some instances, it may be desired to provide an additional gelling agent to hatch materials before pelletizing to provide a green binder for the pellets. Any type of organic or inorganic gelling agent can be used so long as it does not upset the chemical balance of the desired glass. This will usually not be a problem, however, since only a small amount of gelling agent is needed, usually from 0.5% to 4% of the water is all that is necessary. Examples of inorganic gelling agents are:

refined attapulgite ($3MgO.1.5Al_2O_3.8SiO_2.9H_2O$); and Benagu (a highly beneficiated hydrous magnesium montmorillionite sold by the National Lead Co.) Organic gelling agents are, of course, fugitive, and are burned off without altering the chemical composition of the batch. Suitable examples are Carbopol (a trademarked material produced by B. F. Goodrich Co. under U.S. Pat. No. 2,789,053); Kelzan (a polysaccharide gum produced by fermentation of an alginate with xanthomonas comphistris bacterium and sold by the Kelco Co.); and any good methyl cellulose or to other organo substituted cellulosic gelling agent.

While the invention has been described in considerable detail, I do not wish to be limited to the particular embodiments shown and described; and it is my intention to cover hereby all novel adaptations, modifications, and arrangements thereof, which come within the practice of those skilled in the art to which the invention relates.

I claim:

1. In a process of producing glass by charging to a melting furnace and melting therein a batch having the composition:

| INGREDIENT | PARTS BY WEIGHT |
|---|---|
| $SiO_2$ | 20-35 |
| Clay | 20-35 |
| $CaCO_3$ | 15-25 |
| Burnt Colemanite | 10-25 |
| Inorganic fluoride | 0.2-5 |
| $NaNO_3$ | 0-1 |
| $CaSO_4.2H_2O$ | 0-1 | with the total of the alkali metal and/or alkaline earth metal salts that are ionizable in water at room temperature ($NaNO_3$ and $CaSO_4.2H_2O$) being at least 0.10% by weight, the improvements of pelletizing the batch materials using water, charging the wet pellets containing free water onto the upper surface of a vertical pellet treatment bed having a lower discharge end communicating with the furnace, substantially simultaneously (1) withdrawing pellets through said lower discharge end for charging to the furnace, (2) moving the remaining pellets by gravity downwardly through the bed, (3) passing the hot furnace effluent gas upwardly through the bed to heat the pellets therein, and (4) drying the wet pellets on the upper surface of the bed by the spent effluent gas which has already passed through the bed, the sequential performance of steps (3) and (4) on the effluent gas being effective (a) to remove at least some of the boron from the effluent gases, (b) to remove at least some of the fluorine from the effluent gases, and (c) to remove at least some of the particulate matter from the effluent gases, and the presence of the wet particles at the surface of the bed enhancing the performance of steps (3) and (4).

2. A process as defined in claim 1, wherein at least some of the vaporized boron compounds in the furnace effluent gas is removed during the performance of steps (3) and (4) as alkaline earth metal borates.

3. A process as defined in claim 1, wherein at least some of the gaseous fluorine in the furnace effluent gas is removed during the performance of steps (3) and (4) as alkaline earth metal fluorides.

4. In a process of producing glass from a batch containing from 0 to 1% by weight of any sodium salt that is ionizable in water at room temperature and from 0 to 1% by weight of any calcium salt that is ionizable in water at room temperature and having at least 0.10% by weight of total sodium and calcium salts that are ionizable in water at room temperature and a volatile borate in a furnace which liberates hot effluent gases including volatile borates and solid contaminant particles, the improvement comprising: pelletizing the batch materials using water and the ionizable alkali metal and/or alkaline earth metal salt present in the batch, charging the wet pellets containing free water to the charging end of a pellet treatment bed having charging and discharging ends, maintaining a layer of wet pellets at the charging end of the pellet bed, and conducting the hot furnace effluent gases through the bed and through the layer of wet pellets, the step of conducting being effective to remove at least some of the volatile borates and the solid particles from the furnace effluent gases.

* * * * *